United States Patent Office 2,858,295
Patented Oct. 28, 1958

2,858,295
UNSATURATED THIOUREIDO ETHERS, POLYMERS THEREOF AND PROCESS OF MAKING THEM

Sidney Melamed, Philadelphia, Pa., assignor to Rohm & Haas Company, Philadelphia, Pa., a corporation of Delaware No Drawing. Application July 15, 1955
Serial No. 522,399

17 Claims. (Cl. 260—68)

This invention concerns novel thioureidoalkyl vinyl ethers, polymers thereof and process of making the monomers and polymers.

The new compounds of the present invention have the structure of Formula I:

I
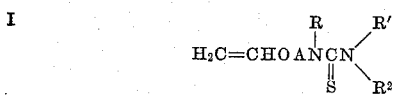

where A is an alkylene group having 2 to 10 carbon atoms of which at least 2 carbons extend in a chain between the adjoining N and O atoms, R is selected from hydrogen and alkyl groups having 1 to 18 carbon atoms, R' and $R^2$ together may be selected from tetramethylene, —$(CH_2)_4$—; pentamethylene, —$(CH_2)_5$—; or 3-oxapentamethylene, —$(CH_2)_2O(CH)_2$—, forming a heterocycle with the adjoining nitrogen atom and separately, R' may be selected from hydrogen, phenyl, chlorophenyl, naphthyl, benzyl, alkoxybenzyl, cyclohexyl, and alkyl groups having 1 to 18 carbon atoms, and $R^2$ may be selected from the hydrogen and lower alkyl groups having 1 to 4 carbon atoms, with the proviso that when both R' and $R^2$ are other than H and A has less than 4 carbons in a chain separating the adjoining oxygen and nitrogen atoms, R is an alkyl group.

In general, the customary procedure for producing thioureido compounds by the reaction of an amine with an inorganic metal thiocyanate in the presence of acid is unsuitable for the production of the new compounds because of the sensitivity of the ether oxygen atom. In view of this situation, the compounds of the present invention have been obtained by one of three processes as follows:

The first procedure is used to produce compounds of Formula I in which R' and $R^2$ are both hydrogen. This process involves the fusion of molar equivalent quantities of thiourea with an amine of Formula II:

II  $H_2C=CHOANHR$
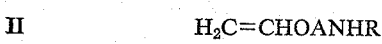

where the symbols are the same as previously defined. The temperature employed for the fusion may vary from 100° to 150° C. or more and is preferably from 120° to 130° C. The time required for the reaction depends upon the temperature and other variables and may be from 1 to 8 hours or more. The reaction is preferably carried out under substantially anhydrous conditions, preferably less than 2% of water being present. While solvents for the reactants may be present, it is preferable not to carry the reaction out in such solvents. Measurement of the evolution of ammonia serves to determine when the reaction is complete. The reaction mass obtained may contain some dialkyl thioureas as by-products. While the reaction mass may often be used without isolation of the product of Formula I as a pure compound, isolation may be effected wherever desired, such as by recrystallization from solvents such as ethyl acetate, hot water, and so on. Examples of amines which may thus be reacted are as follows:

$CH_2=CHOCH_2CH_2NH_2$
$CH_2=CHOCH_2CH_2NHCH_3$
$CH_2=CHOCH_2CH_2CH_2NH_2$
$CH_2=CHOCH_2CH(CH_3)NH_2$
$CH_2=CHOCH(CH_3)CH_2NH_2$
$CH_2=CHOCH_2C(CH_3)_2NH_2$
$CH_2=CHOC(CH_3)_2CH_2NH_2$
$CH_2=CHOCH_2CH_2CH_2CH_2NH_2$
$CH_2=CHOC(CH_3)_2CH_2CH(CH_3)NH_2$
$CH_2=CHOCH_2CH_2CH(CH_3)(CH_2)_3C(CH_3)_2NH_2$
$CH_2=CHOCH_2C(CH_3)_2CH_2NH_2$
$CH_2=CHOCH_2CH(CH_3)NHCH_3$

The vinyl aminoalkyl ether may have an N-substituent (R) other than hydrogen and the preferred methyl group, such as ethyl, butyl, phenyl, methylphenyl, butylphenyl, benzyl, methylbenzyl, cyclohexyl, and so on, typical compounds then being $CH_2=CHOCH_2CH_2NHC_6H_5$ (distilling at 128°–130° C./9 mm.),

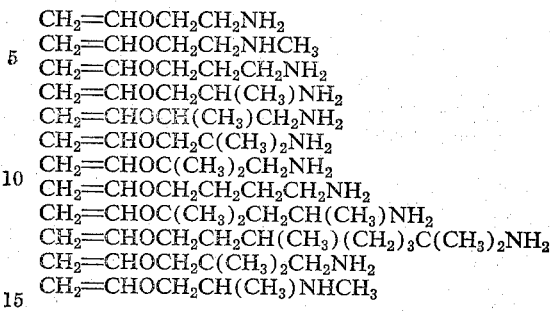
$CH_2=CHOCH_2CH_2NHC_4H_9$ (distilling at 88°–99° C./120 mm.), $CH_2CHOCH(CH_3)CH_2NHC_2H_5$ (distilling at 72°–73° C./120 mm.),

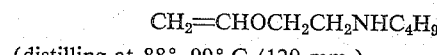
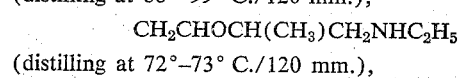
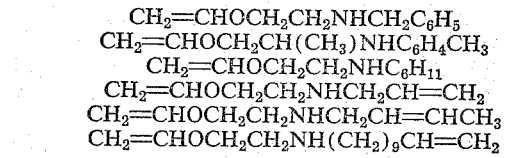

$CH_2=CHOCH_2CH_2NHC_{18}H_{33}$ (2 double bonds soya amine), $CH_2=CHOCH_2CH_2NHC_{18}H_{35}$ (oleyl amine).

Compounds of Formula I in which one of R' and $R^2$ is a hydrogen atom may be obtained by the reaction of organic isothiocyanates of the Formula III:

III  R'NCS

on amines of Formula II, such as any of those listed hereinabove. Examples of the organic isothiocyanates that may be employed include phenyl isothiocyanate, chlorophenyl isothiocyanate, benzyl isothiocyanate, naphthyl isothiocyanate, cyclohexyl isothiocyanate, methyl isothiocyanate, ethyl isothiocyanate, propyl isothiocyanate, isopropyl isothiocyanate, butyl isothiocyanate, isobutyl isothiocyanate, t-butyl isothiocyanate, amyl isothiocyanate, isoamyl isothiocyanate, hexyl isothiocyanate, octyl isothiocyanate, decyl isothiocyanate, dodecyl isothiocyanate, hexadecyl isothiocyanate, oleyl isothiocyanate.

The amine of Formula II and the isothiocyanate are reacted at temperatures of −5° to 80° C. and preferably from about 0° to 30° C. In some cases, the reaction is sufficiently mild to enable the two reactants to be mixed together in the lower part of the range temperatures specified. However, it is generally preferable to add one reactant gradually to the other. It is preferred to carry out the reaction in the presence of inert solvents for the reaction, such as benzene, toluene, xylene, ether, petroleum ether, alcohols, such as methanol, ethanol, and isopropanol, and chlorinated hydrocarbons, such as carbon tetrachloride. In some cases, the solvent may serve to dissolve the reaction product of Formula I, but in other cases the reaction product desired is insoluble therein and precipitates out. The time of the reaction may be relatively short, from about an hour to about two hours in duration depending upon the amount of reactants to be converted to the end product. The rate of addition of one reactant to the other depends upon the available cooling capacity. After completion of the reaction, the desired product may be isolated in a suitable manner, such as by filtration, recrystallization, or the like.

The compounds of Formula I wherein both R' and R² are other than hydrogen may be obtained by the reaction of the amines of Formula II above with thiocarbamyl chlorides of Formula IV:

IV 

Examples of the thiocarbamyl chlorides include N,N-dimethyl carbamyl chloride, the thiocarbamyl chloride obtained from the reaction of thiophosgene with morpholine, piperidine or pyrrolidine, N,N-diethyl thiocarbamyl chloride, and so on. In this procedure, one of the reactants, usually the chloride, is dropped or added gradually to the other. Generally one mole of the chloride is added to two moles of the amine so that an excess of the amine is present to accept the hydrogen chloride liberated. When such an excess of such an amine is used, the reaction is preferably carried out under substantially anhydrous conditions in organic solvents, such as benzene, toluene, xylene, ether, or petroleum ether, at a temperature of about 0° to 50° C. Instead of using excess amine, equimolar amounts of the amine and chloride may be reacted with sufficient inorganic base to accept the hydrogen chloride liberated. Suitable inorganic bases include alkali metal hydroxides or carbonates, such as those of potassium, sodium, or lithium. With the inorganic bases, it is preferred to employ a small proportion of water in addition to the organic solvent, such as one of those above. The temperature may be from 0° to 80° C. The time of reaction depends on the rate of addition which, in turn, may depend on the cooling capacity avialable. Generally, 2 to 12 hours is adequate time.

While all of the products of Formula I have many common characteristics, they may be divided into several classes, each of which contain compounds differing in certain characteristics from those of the other classes. These distinctive sub-groups may be generally set out in the following Formulas V, VI, and VII:

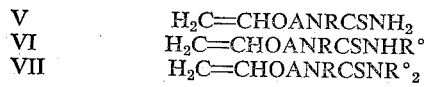

wherein the terminal nitrogen in V carries two hydrogens, that in VI carries only one hydrogen, and that in VII carries none.

The compounds of Formulas V and VI are generally solids, usually melting below 100° C., although some are liquids. Of these compounds, those of Formula VI are easier to make and more stable to normal storage conditions. They are also more widely soluble in various organic solvents. The compounds of both Formulas V and VI are reactive with formaldehyde or other aldehydes to produce heat-convertible condensates useful for modifying aminoplast resins as pointed out hereinbelow. In addition, all of them form isothiouronium salts (or so-called pseudo-thioureas) in the presence of an alkylating agent, such as methyl chloride, dimethyl sulfate, benzyl chloride and so on. Such salts as are obtained from the lower alkyl alkylating agents, such as those of methyl or ethyl chloride, are water-soluble salts. The compounds of Formulas V and VI also form water-soluble salts with alkali metals in aqueous alkaline solutions, such as those of sodium hydroxide or potassium hydroxide. Those compounds of Formula V in which R is hydrogen or methyl and A is ethylene are water-soluble. When the compounds of Formula V contain carbon atoms totaling over 6, they are generally insoluble in water. None of the compounds of Formula VI are soluble in water but like the compounds of Formula V they are soluble in alkaline solutions by the formation of salts with the alkali metals. The compounds of Formula V are generally soluble in polar organic solvents, such as alcohols, including methyl through isopropyl alcohol, esters, such as ethyl acetate and the like. Those compounds of Formula V in which the substituents A and R are of small size are insoluble in hydrocarbon solvents. However, as A approaches 8 to 10 carbon atoms and/or R approaches 12 to 18 carbon atoms, the compounds become increasingly soluble in hydrocarbons, such as benzene, xylene, toluene, hexane, heptane, and especially in aromatic and naphthenic naphthas.

The compounds of Formulas V and VI are generally useful as fungicides, insecticides, bactericides, and as such they may be applied for the coating or impregnation of textiles, especially cellulosic and wool types, wood, and so on. They are also useful as chemical intermediates for the production of isothiouronium salts which are useful as antistatics for the treatment of textiles comprising hydrophobic fibers, such as cellulose acetate, polymers of vinyl chloride, acrylonitrile, vinylidene chloride, or copolymers of these monomers with each other as well as with other materials, such as vinyl acetate and the like. The compounds of Formulas V and VI may also be used in conjunction with aminoplast resin-forming condensates, such as those of ureaformaldehyde, thioureaformaldehyde, and condensates of formaldehyde with triazine, such as malamine and substituted melamines or mixtures of such aminoplasts. As modifiers for such aminoplasts, the compounds of Formulas V and VI serve to improve the water-resistance of the thermoset products, such as moldings, castings, or coatings, obtained therefrom.

Compounds of Formula VII, wherein A is an alkylene group having at least 4 carbon atoms in a chain separating the oxygen and nitrogen and R is hydrogen, retain the capacity to form isothiouronium salts and to react with formaldehyde as in the case of the compounds of Formulas V and VI. However, the compounds of Formula VII, in which R is an alkyl group and the terminal nitrogen carries no hydrogen, are quite distinctive from the compounds of Formulas V and VI. Most of these compounds of Formula VII are liquids. They require a distinctive preparation procedure as compared to the compounds of Formulas V and VI as pointed out above. Even more important is the fact that they have outstanding stability as compared to the other compounds because of the complete substitution of the nitrogen atoms. They are insoluble in water but all of them, even those which contain lower molecular weight substituents such as methyl groups, are readily soluble in both polar and non-polar solvents, such as alcohols, including methanol, ethanol, and isopropanol, esters, such as ethyl acetate, dimethylformamide, benzene, zylene, toluene, and naphthas. They are quite distinctive in that they cannot react with formaldehyde or other aldehydes and they do not form thiouronium salts.

These compounds of Formula VII, in which the nitrogen atoms are completely substituted, are useful as oil additives, such as to lower the pour point and as plasticizers for vinyl resins, nitrocellulose, and so on.

While the aminoalkyl vinyl ethers of Formula II, from which the thioureido derivatives of the present invention are obtained, are not readily polymerized with small amounts of acid catalysts or free-radical catalysts, the substituted thioureidoalkyl vinyl ethers of this invention are polymerizable to form homopolymers under the influence of azo catalysts. On the other hand, whereas alkyl vinyl ethers are readily polymerized with acid catalysts and are but slightly affected by normal peroxidic catalysts, the thioureidoalkyl vinyl ethers of this invention do not respond to catalytic quantities in homopolymerization procedures of acids or to peroxides whether organic or inorganic under the various conditions which are known to result in polymerization of many monoethylenically unsaturated compounds, including other types of vinyl compounds.

Amino-substituted vinyl ethers have been reported to polymerize with molar proportions of sulfur dioxide to give products of relatively low molecular weight which contain units from sulphur dioxide. It has been found that thioureidoalkyl vinyl ethers of the present invention likewise polymerize with molar proportions of sulphur dioxide to form products which have low molecular weight and which include sulfur dioxide as a component. These polymers differ in both these respects from the polymers of high molecular weight which are formed in the presence of azo catalysts from thioureidoalkyl vinyl ethers. The thioureido group actually destroys the ability of alkyl vinyl ethers to respond to catalytic amounts of polymerization initiators of acid type.

The polymers of this invention furthermore are distinct from polymers of allyl derivatives, such as allylurea or allylthiourea, which form only low molecular weight polymers at best. Allylurea or allylthiourea, for example, is a powerful chain transfer agent which inhibits formation of other polymers.

Compounds of Formula I, regardless of which of the groups of Formulas V, VI, and VII they happen to be, are all polymerizable to form homopolymers in the presence of azo catalysts. This homopolymerization may be carried out in bulk, solution, emulsion, or suspension procedures under neutral or slightly alkaline conditions. Generally, a temperature of 50° to 100° C. and a time of 2 to 24 hours is employed. From 0.5 to 10% by weight of an azo catalyst may be used based on the weight of monomer or total weight of monomers. In the solution procedure, it is preferred to have the monomer in a concentration of at least 50% by weight. In the emulsion or suspension procedures, an emulsifier may be employed, preferably of non-ionic type. Homopolymers may be obtained having molecular weights of 10,000 to 20,000 or more by any of these procedures.

Typical azo catalysts are azodiisobutyronitrile, azodiisobutyramide, dimethyl (or diethyl or dibutyl) azodiisobutyrate, azobis($\alpha,\gamma$-dimethylvaleronitrile), azobis ($\alpha$-methylbutyronitrile), azobis($\alpha$-methylvaleronitrile), dimethyl azobismethylvalerate, and the like. In these catalysts one of the carbons bonded to the tertiary carbon atom has its remaining valences satisfied by at least one element from the class consisting of oxygen and nitrogen.

The compounds of Formula I may also be copolymerized with other monoethylenically unsaturated polymerizable compounds in the presence of azo catalysts. When a large proportion of a comonomer of a type other than that of Formula I is to be co-polymerized with the compound of the present invention, other free-radical catalysts may prove as desirable as azo catalysts. For example, organic peroxides, such as butyl perbenzoate, or benzoyl peroxide, are suitable for polymerization in bulk or in solution, while ammonium persulfate and the like are useful in the polymerization of dispersions.

As useful unsaturated compounds for forming the copolymers there may be used acrylic acid, methacrylic acid, esters of acrylic acid or methacrylic acid and monohydric alcohols such as methyl, ethyl, butyl, octyl, dodecyl, cyclohexyl, allyl, methallyl, undecenyl, cyanoethyl, dimethylaminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, or divinylbenzene; ethylene diacrylate or dimethacrylate, bis(vinoxyethyl)urea, vinoxyethyl acrylate vinoxypropyl acrylate, etc. Where two polymerizable vinylidene groups occur in the same molecule, as in compounds toward the end of the above list, crosslinking results where more than one to two percent thereof is used in forming the copolymer.

The polymers may be used as pesticides, especially as bactericides, fungicides, and insecticides, and in this connection the polymers or copolymers obtained from monomers of Formulas V and VI are particularly useful. Generally the polymers are somewhat more tenacious and rain-proof than the monomers. The polymers, like the monomers, especially of the compounds of Formulas V and VI, are adapted to be applied to textiles, wood, cellophane, and the like, to protect them from deterioration by fungal or bacterial attack. Polymers including homopolymers of the compounds corresponding to Formula VII wherein all of the nitrogen atoms are completely substituted may be used in the production of coatings and impregnants, as adhesives or components thereof. For these purposes, they may be mixed with such film-forming materials as linear polyesters, including polyethylene glycol, terephthalate, nitrocellulose, rosin esters and the like with which they are compatible. The polymers of the present invention are particularly useful for the modification of such film-forming materials as plasticizers, extenders and oxidants.

Copolymers of the present invention, in which the nitrogen atoms are not completely substituted but still are attached to hydrogen atoms as in the classes of Formulas V and VI, especially are useful as two-stage monomers. They may first be converted by addition polymerization to linear fusible or soluble polymers which are then adapted to be applied to fabrics or other substrates of cellulose, wool, nylon, rayon, and so on and subsequently cured to an infusible and insoluble condition on the fabric to provide protective coatings thereon, to crease-proof or crush-proof the fabric, to improve the dimensional stability of wool fabrics, to modify the dyeing and solubility properties of acrylonitrile polymers, fibers or fabrics, or to increase the water-repellent character or to impart water-repellent character to fabrics. To accelerate the second stage curing or cross-linking, acidic catalysts may be used, such as ammonium phosphate, ammonium thiocyanate, hydrochloric or other acid salts of a hydroxy aliphatic amine including 2-methyl-2-amino-1-propanol, 2-methyl-2-amino-1,3-propandiol, tris(hydroxymethyl)aminomethane, 2-phenyl-2-amino-1-propanol, 2-methyl-2-amino-1-pentanol, 2-aminobutanol, triethanolamine, 2-amino-2-ethyl-1-butanol, also ammonium chloride, pyridine hydrochloride, benzyldimethylamine oxalate.

Besides being adapted to be applied to previously-formed fibers, filaments or fabrics of polymers of acrylonitrile, such as those which contain 90% acrylonitrile or more, with vinyl chloride, vinylidene chloride, vinyl acetate or the like, the linear, heat-convertible polymers of the present invention may be incorporated into the spinning melt or solution containing such a polymer of acrylonitrile, and after the spinning and the drying of the fibers or filaments made therefrom, the linear polymer of the present invention may be converted to insoluble and infusible form by a suitable baking or curing operation. The polymers and copolymers of the present invention may also be used as oil additives, especially to lower the pour point and to improve the viscosity index.

In the examples which are illustrative of the invention, the parts given are by weight unless otherwise specifically indicated:

*Example 1*

A solution of 23.0 grams (0.2 mole) of n-butyl isothiocyanate in 100 ml. of benzene is treated slowly with stirring at 20°–30° C. with 17.4 grams (0.2 mole) of 2-aminoethyl vinyl ether. The mixture is warmed to 50° C. to complete the reaction. The solvent is removed by stripping at reduced pressure. The residue, 40.6 grams, crystallizes and is purified by recrystallization from a mixture of toluene and petroleum ether to give 30.4 grams of a 75.4% yield, of material as a white, crystalline solid, M. P. 42–47° C. The product, N-n-butyl-N′-vinyloxyethylthiourea,

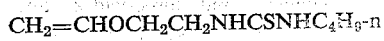

contains by analysis 13.9% nitrogen and 16.5 sulfur; the calculated values are 13.85% nitrogen and 15.83% sulfur. The product shows a strong absorption at 12.2 microns characteristic of a vinyl ether.

The product is an active insecticide and fungicide. A 12.5% emulsion concentrate in HAN solvent, a higher aromatic naphtha containing methylated naphthalene, applied at the rate of 1 part in 800 gave a 99% kill of bean aphids and an 89% kill of spider mites. Even at 1 part in 1600 a 69% kill of mites was obtained. The compound is also an effective mite ovicide giving 73% control at 1 part in 800. The compound is a fungicide giving 100% control of both *Monilinea fructicola* and *Stemphylium sarcinaeforme* at 0.1%. The compound is also a bacteriostat giving a 21 mm. zone of inhibition against *Micrococcus pyogenes* var. *aureus*.

*Example 2*

A 20% solution of the thiourea of Example 1 in ethanol is treated with a molar equivalent of dimethyl sulfate and warmed at 60°–80° C. for two hours. The product is N-n-butyl-N′-vinyloxyethyl-S-methylthiouronium methosulfate. It is a solid, completely soluble in water. Treatment with alkali causes cleavage with the production of methyl mercaptan.

The product is a bactericidal fungicide. It also serves as an antistatic agent for Dacron (polyethyleneglycol terephthalate), Orlon (copolymer of about 90% acrylonitrile), and nylon.

*Example 3*

A solution of 23.0 grams (0.2 mole) of n-butyl isothiocyanate in 100 ml. of benzene is treated dropwise with 23.0 grams of 2-aminoisobutyl vinyl ether. The resultant solution is then warmed to 45° C. for 30 minutes. Benzene is removed by stripping at reduced pressure to give 43.6 grams of N-(1,1-dimethyl-2-vinyloxyethyl)-N′-n-butylthiourea as a viscous oil. The product,

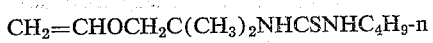

contains 12.1% nitrogen and 14.1% sulfur; the theoretical values are 12.2% and 13.9% respectively. The material absorbs strongly at 12.2 microns indicating the presence of a vinyl ether group.

The compound gives 100% control of *Stemphylium sarcinaeforme* at 0.1% and is non-phytotoxic at 1%. It gives 91% control of bean aphids, 90% control of spider mites and 50% control of mite ova at 1:800. The product is also bacteriostatic giving an 11 mm. zone of inhibition against *M. pyogenes* var. *aureus* or an agar plate.

*Example 4*

A mixture of 5 grams of the product of Example 1, vinyloxyethyl-N′-n-butylthiourea, and 0.25 gram of dimethyl azobisisobutyrate is placed in a flask and heated in a nitrogen atmosphere at 75° C. for sixteen hours. The product is dissolved in ethanol and the polymer precipitated by the addition of benzene. There is thus obtained 2.3 grams of polymer as a waxy solid soluble in warm methanol or cold acetone and insoluble in benzene or toluene.

The polymer is useful in several ways. It shows pesticidal properties similar to those of the parent monomer but shows increased tenacity and lessened phytotoxicity when applied to plants. Treatment of the polymer in ethanol solution with an equivalent of benzyl chloride or dimethyl sulfate produces in each case a water-soluble, polymeric thiouronium salt useful as a bactericidal agent or anti-static agent for the treatment of cellulose acetate. The polythiourea is reactive with formaldehyde and formaldehyde-containing materials. Mixing of the polymer with urea-formaldehyde or other aminoplast resins in amounts of from 10% to 50% or more produces coreacted materials which, when applied as coatings on fabrics, improve the resistance to water and to fungal and bacterial degradation.

The polythiourea is also useful as an additive to soluble phenol-formaldehyde resins functioning in amounts of 10% to 25% as a cross-linking agent and catalyst for further cure.

*Example 5*

By the procedure of Example 4 the product of Example 3, N(1,1-dimethyl-2-vinyloxyethyl)-N′-n-butylthiourea, is converted to a polymer readily soluble in organic solvents such as acetone, ethanol, benzene, carbon tetrachloride, petroleum ether and dimethylformamide.

The polymer is thus useful as a coating material for the treatment of textiles. On application to textile fabrics from solution in an organic solvent or from aqueous emulsions, as by dipping or padding, the treated fabrics after drying are resistant to rotting and deterioration by fungal or bacterial attack.

*Example 6*

A solution of 2-aminoethyl vinyl ether, 8.7 grams (0.1 mole), in 50 ml. of benzene is treated dropwise with stirring at 5° to 10° C. with 13.5 grams (0.1 mole) of phenyl isothiocyanate. The reaction mixture is allowed to warm to room temperature and the product that precipitates is collected by filtration and purified by recrystallization from aqueous ethanol. There is thus obtained a white, crystalline solid, M. P. 89°–91° C., containing 12.74% N and 14.76% S, N-vinyloxyethyl-N′-phenylthiourea, CH$_2$=CHOCH$_2$CH$_2$NHCSNHC$_6$H$_5$, for which the calculated values are 12.6% N and 14.4% S.

A solution of the compound in ethanol is treated with an equivalent of phenoxyethyl bromide or dodecenyl chloride. In each case the corresponding isothiouronium salts are formed and are particularly useful as bactericidal agents.

The thiourea itself is bacteriostatic giving a 12 mm. zone of inhibition against *M. pyogenes* var. *aureus* in agar plate tests. The compound also gives 100% control of *S. sarcinaeforme* and *M. fructicola* at 1% and a 72% control of the former fungal organism at 0.1%. It is not phytotoxic at 1% levels to tomato plants.

*Example 7*

The condensation of 13.5 grams (0.1 mole) of phenyl isothiocyanate and 11.5 grams (0.1 mole) of 2-aminoisobutyl vinyl ether in 50 ml. of benzene at 5°–10° C. is effected as in Example 6. The product is soluble in the benzene and is isolated by stripping the benzene at reduced pressure. Purification is accomplished by recrystallization from aqueous ethanol to give the product, N(1,1-dimethyl-2-vinyloxyethyl)-N′-phenylthiourea,

as a white crystalline solid, M. P. 72°–74° C. The product contains 11.3% nitrogen and 12.73% sulfur; the theoretical values are 11.2% N and 12.7% S.

The product is useful for the control of red spider mites. An emulsion concentrate is prepared in HAN solvent at 12.5% of the thiourea and applied to infested plants at 1 part in 800 to give a 78% kill of mites. The compound is also a bacteriostat and gives a 12 mm. zone of inhibition against *M. pyogenes* var. *aureus* in agar plate tests.

Example 8

A solution of 8.7 grams (0.1 mole) of 2-aminoethyl vinyl ether in 50 ml. of dry ether is added to 17.9 grams (0.1 mole) of p-methoxybenzylisothiocyanate in 50 ml. of dry ether at 20° C. No exotherm is observed. The reaction mixture is diluted with 100 ml. of petroleum ether (B. P. 60°-70° C.) and cooled to 0° C. The product, 21 grams (79% yield), crystallizes and is isolated by filtration, M. P. 56°-60°. It contains 10.4% nitrogen and 12.3% sulfur corresponding to N-p-methoxybenzyl-N'-vinyloxyethylthiourea for which the calculated values are 10.52% N and 12.03% S.

The product is a fungicide giving 100% control of *Stemphylium sarcinaeforme* and *Monilinia fructicola* at 0.1% and showing no phytotoxicity to tomato plants at 1.0 concentration. The compound also gives a 15 mm. zone of inhibition against *M. pyogenes* var. *aureus* on agar plates and is thus bacteriostatic.

Example 9

By the procedure of Example 6 there is reacted 2-(N-methylamino)ethyl vinyl ether and an equivalent molar amount of p-chlorophenyl isothiocyanate. The product is the corresponding thiourea,

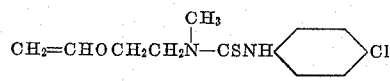

The product is readily soluble in organic solvents such as benzene or carbon tetrachloride and is useful for the control of spider mites. The product is also useful as an intermediate for the preparation of isothiouronium salts. Thus, reaction of the product with an equivalent quantity of p-chlorobenzyl chloride produces the corresponding isothiouronium salt which is an effective bactericide.

Example 10

A solution of 25.5 grams (0.1 mole) of 2-(N-dodecylamino)-ethyl vinyl ether in benzene is treated with an equivalent molar quantity of cyclohexyl isothiocyanate. The product isolated by stripping is a waxy solid, readily soluble in organic solvents and correspondings to the structure,

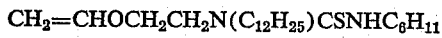

where $C_6H_{11}$ is the cyclohexyl radical.

The product is applied to rayon and cotton textiles to impart water and rot resistance thereto in amounts of 2-10% by padding or dipping, employing solutions and emulsions of the compounds and subsequently fixing by drying at 100°-220° F. depending on the solvent.

Example 11

In a manner analogous to that of Example 10, there is condensed 2-(N-octadecylamino)isopropyl vinyl ether and lauryl isothiocyanate. The product, a soft wax, on application of 3% to 5% to textiles, fabrics or other porous substances such as wood, renders them moisture-repellent and resistant to fungal and bacterial degradation.

Example 12

In a manner analogous to Example 10, there is condensed methyl isothiocyanate and 2-(vinyloxy)decyl amine to give a product of the structure,

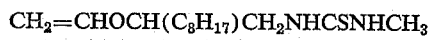

Example 13

1-naphthyl isothiocyanate is condensed, by the procedure of Example 10, with 5-aminopentyl vinyl ether to give the following thiourea,

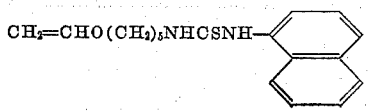

Example 14

Octadecyl isothiocyanate is readily condensed with 3-aminopropyl vinyl ether by the procedure of Example 6 to give N-3-vinyloxypropyl-N'-octadecylthiourea, a waxy solid which imparts water-repellency to fabrics of cotton and rayon impregnated with about 4% by weight thereof.

The product of Example 14 is further reacted with formaldehyde and the resultant methylol derivative is applied to textiles of cotton and rayon and cured by heat or by heat and acidic catalysts, such as ammonium chloride, to impart durable water-repellency to the fabric.

Example 15

A mixture of 87 parts of 2-aminoethyl vinyl ether and 76 parts of thiourea are mixed and heated carefully to 130°-140° C. Ammonia evolution, which commences at about 105-110° C. is essentially complete at 130° C. The dark, semi-crystalline mass is somewhat soluble in water and soluble in aqueous alcohol. The product is essentially N-vinyloxyethylthiourea,

It is a fungicide. When added to urea-formaldehyde and other aminoplast resins in amounts of 20% to 50% by weight of the aminoplast resin, it improved water-resistance in coatings and castings made therefrom.

Example 16

By the procedure of Example 15, there is condensed 101 parts of N-methylaminoethyl vinyl ether and 76 parts of thiourea. The product is a dark, semi-crystalline material consisting largely of N-methyl-N-vinyloxyethyl thiourea, $CH_2=CHOCH_2CH_2N(CH_3)CSNH_2$. An alcoholic solution of the product reacted readily with benzyl chloride to produce the corresponding isothiouronium salt, soluble in water.

Example 17

A mixture of 51 grams of 2-(N-methylamino)ethyl vinyl ether, 200 ml. of benzene, 100 ml. of water and 53 grams of sodium carbonate is treated at 5°-10° C. with 62 grams of dimethyl thiocarbamyl chloride,

The reaction is allowed to stir at room temperature for 1 hour and the product, soluble in the benzene, is separated from the water. The benzene solution is dried and the product isolated as a yellow oil, B. P. 80°-90° C./2.4 mm. Hg. It contains both nitrogen and sulfur and corresponds to the structure,

The product does not react with formaldehyde in the presence of alkali. The product does not form an isothiouronium salt upon treatment with benzyl chloride.

Example 18

By the procedure of Example 17 and replacing the dimethylthiocarbamyl chloride wholly with an equivalent molar quantity of the thiocarbamyl chloride derived from piperidine, namely

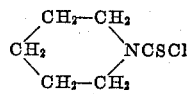

there is obtained N-methyl-N-vinyloxyethyl-N',N'-pentamethylene thiourea,

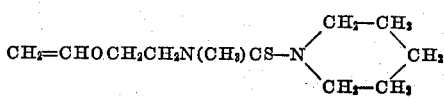

Example 19

Again by the procedure of Example 17 but substituting the thiocarbamyl chloride derived from morpholine for that used in Example 17, there is obtained

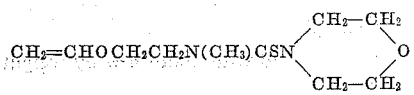

The compound is distillable, readily soluble in organic solvents, and does not react with either formaldehyde (in the presence of base) or benzyl chloride.

Example 20

Portions of each of the products of Examples 17, 18, and 19 are each mixed with 2% by weight of dimethyl azobisisobutyrate and heated at 75° C. for 8 hours in containers flushed with nitrogen. The polymers are soft and readily soluble in organic solvents. They are compatible with a wide variety of film-forming materials, such as linear polyesters, nitrocellulose, rosin esters and the like. They serve to modify the properties of castings and coatings made of such film-forming materials.

Example 21

A mixture of 2 parts of the product of Example 6, 4 parts of methyl methacrylate, 2 parts of toluene, and 0.04 part of dimethyl azobisisobutyrate is heated at 65° C. for 16 hours. The resultant copolymer is tough and rubbery, soluble in ethylene dichloride and insoluble in methanol or toluene. The dried purified polymer, 5.5 grams, contained by analysis 3.01% nitrogen and 3.40% sulfur equivalent to a molar ratio of 7:1 of methacrylate to vinyl ether.

A solution of the polymer in ethylene dichloride is applied to metal, concrete, asbestos and other materials to provide a durable, tough, protective coating upon drying.

Example 22

A mixture of 5 parts of the product of Example 7, 2 parts of methyl methacrylate, 2 parts of dimethylformamide, and 0.03 part of dimethyl azobisisobutyrate is heated at 65° C. for 16 hours. The resultant solution is viscous and clear and can be diluted with toluene. The polymer is precipitated by the addition of methanol to the dimethylformamide solution. The dried polymer contains 2.86% nitrogen and 3.44% sulfur corresponding to a molar ratio of 7:1 of methacrylate to vinyl ether.

A portion of the polymer solution is admixed with 20% by weight, on the polymer weight, of bis-N,N'-methoxymethylethyleneurea and 0.75% of p-toluenesulfonic acid. Films are prepared on glass and metal panels from this mixture and the coated panels are baked at 300° F. for 30 minutes. The resultant coatings are solvent resistant and have good adhesion to the substrate panel. The films are thus useful as protective and decorative finishes.

Example 23

A mixture of 10 parts of the product of Example 7 and 90 parts of butyl acrylate is emulsified with 4 parts of t-octylphenoxypolyethoxyethanol containing 10 oxyethylene units in 125 parts of water. One part of diethylenetriamine and 0.3 part of ammonium persulfate are added and the temperature maintained at 20°–35° C. The resultant emulsion, containing a copolymer of the monomers cited above, is useful in the treatment of woolen fabrics to prevent shrinkage. Thus, a wool fabric is padded in the emulsion (diluted to 10% solids) so as to give a pickup of 4–5% resin on fabric. The fabric is then dried at 220° F. for 10 minutes. The fabric obtained is much more resistant to shrinkage and felting on washing than an untreated control and still maintains a soft, pliable hand.

Example 24

A mixture of 5 parts of the product of Example 3, 70 parts of acrylonitrile and 25 parts of ethyl acrylate is emulsified with 5 parts of octylphenoxypolyethoxyethanol and 180 parts of water. There is then added 1.5 parts of tetraethylenepentamine and 0.5% diisopropylbenzene hydroperoxide. The temperature is maintained below 50° C. The polymer is coagulated and dried and is readily soluble in dimethylformamide. The resultant solution is passed through spinnerets into a coagulating bath and the fibers collected and stretched. The resultant fibers are suitable for spinning and weaving operations and are readily dyed.

It is to be understood that changes and variations may be made without departing from the spirit and scope of the invention as defined in the appended claims.

I claim:

1. A composition comprising N-n-butyl-N'-vinyloxyethylthiourea.
2. A composition comprising N-(1,1-dimethyl-2-vinyloxyethyl)-N'-n-butylthiourea.
3. A composition comprising N-vinyloxyethyl-N'-phenylthiourea.
4. A composition comprising N(1,1-dimethyl-2-vinyloxyethyl)-N'-phenylthiourea.
5. A composition comprising N-p-methoxybenzyl-N'-vinyloxyethylthiourea.
6. A composition comprising a homoploymer of N-n-butyl-N'-vinyloxyethylthiourea.
7. A composition comprising a homopolymer of N-(1,1-dimethyl-2-vinyloxyethyl)-N'-n-butylthiourea.
8. A composition comprising a copolymer of methyl methacrylate with N-vinyloxyethyl-N'-phenylthiourea.
9. A composition comprising a copolymer of methyl methacrylate with N(1,1-dimethyl-2-vinyloxyethyl)-N'-phenylthiourea.
10. A composition comprising a coplymer of butyl acrylate with N(1,1-dimethyl-2-vinyloxyethyl)-N'-phenylthiourea.
11. A composition comprising a copolymer of acrylonitrile, ethyl acrylate and N-(1,1-dimethyl-2-vinyloxyethyl)-N'-n-butylthiourea.
12. A composition comprising (1) a copolymer of methyl methacrylate with N(1,1-dimethyl-2-vinyloxyethyl)-N'-phenylthiourea, (2) bis-N,N'-methoxymethyl-N,N'-ethyleneurea, and (3) an acidic catalyst.
13. A composition comprising (1) a resin-forming condensate of urea and formaldehyde and (2) N-vinyloxyethylthiourea.
14. A composition comprising a polymer of N-n-butyl-N'-vinyloxyethylthiourea.
15. A compound of the formula $$H_2C=CHOANHCSNHR'$$

where A is an alkylene group having 2 to 4 carbon atoms of which at least 2 carbons extend in a chain between the adjoining N and O atoms, and R' is selected from the group consisting of hydrogen, phenyl, p-methoxybenzyl, and alkyl groups having 1 to 4 carbon atoms.

16. A polymer of a compound as defined in claim 15.
17. A copolymer of a compound as defined in claim 15 with at least one other monoethylenically unsaturated compound.

References Cited in the file of this patent
UNITED STATES PATENTS

| | | |
|---|---|---|
| 1,986,067 | Paquin | Jan. 1, 1935 |
| 2,734,890 | Bortnick | Feb. 14, 1956 |
| 2,734,891 | Melamed | Feb. 14, 1956 |